(12) United States Patent
Detlefs et al.

(10) Patent No.: US 8,220,876 B2
(45) Date of Patent: *Jul. 17, 2012

(54) ELECTRONIC COMPRESSED AIR SYSTEM

(75) Inventors: Carsten Detlefs, Ronnenberg (DE); Heinrich Diekmeyer, Barsinghausen (DE); Frank-Dietmar Lippelt, Barsinghausen (DE); Joachim Reinhardt, Hannover (DE); Bernd Strilka, Hannover (DE)

(73) Assignee: WABCO GmbH, Hannover (DE)

(*) Notice: Subject to any disclaimer, the term of this patent is extended or adjusted under 35 U.S.C. 154(b) by 735 days.

This patent is subject to a terminal disclaimer.

(21) Appl. No.: 10/565,920

(22) PCT Filed: Jul. 12, 2004

(86) PCT No.: PCT/EP2004/007650
§ 371 (c)(1),
(2), (4) Date: Sep. 15, 2006

(87) PCT Pub. No.: WO2005/014359
PCT Pub. Date: Feb. 17, 2005

(65) Prior Publication Data
US 2007/0096554 A1 May 3, 2007

(30) Foreign Application Priority Data

Jul. 28, 2003 (DE) .................................. 103 34 320
Dec. 10, 2003 (DE) .................................. 103 57 762

(51) Int. Cl.
*B60T 13/74* (2006.01)
*B60T 8/34* (2006.01)

(52) U.S. Cl. ........................... 303/3; 303/15; 303/119.1

(58) Field of Classification Search ............. 303/3, 9.63, 303/9.66, 122.15, 157, 158, 118.1, 119.1, 303/DIG. 2, 15; 188/151 R, 152, 352; 60/404, 60/405; 417/302, 304
See application file for complete search history.

(56) References Cited

U.S. PATENT DOCUMENTS 3,181,887 A * 5/1965 Boylan et al. .................. 280/421
3,272,980 A * 9/1966 Freeman ..................... 246/63 A
(Continued)

FOREIGN PATENT DOCUMENTS
DE       28 21 393 A1    11/1978
(Continued)

OTHER PUBLICATIONS

EU Directive 98/12; Jan. 27, 1998.

*Primary Examiner* — Melody Burch
(74) *Attorney, Agent, or Firm* — Kramer Levin Naftalis & Frankel LLP

(57) ABSTRACT

An electronic compressed air system for vehicles includes a compressed air supply part having a compressor, a compressed air consumer part having load circuits forming an air-suspension circuit, and service-brake circuits having reservoirs. The load circuits are supplied with compressed air via solenoid valves. The pressure in the load circuits is monitored by pressure sensors whose signals are evaluated by an ECU that controls the solenoid valves. The solenoid valve of the air-suspension circuit does not include reservoirs and is closed in the de-energized normal state. The solenoid valves of other load circuits, especially of the service-brake circuits are open in the de-energized normal state. With a pressure demand of the air-suspension circuit, the associated solenoid valve is switched by the ECU to open position to establish communication with the compressed air supply part and/or with the service-brake circuits or with the reservoirs thereof, to refill the air-suspension circuit.

13 Claims, 1 Drawing Sheet

U.S. PATENT DOCUMENTS

| | | | |
|---|---|---|---|
| 3,432,210 A * | 3/1969 | Crouch | 303/3 |
| 4,018,485 A * | 4/1977 | Fannin | 303/13 |
| 4,218,882 A | 8/1980 | Farr | |
| 4,484,784 A | 11/1984 | Leiber | |
| 4,616,881 A * | 10/1986 | Muller et al. | 303/7 |
| 4,799,707 A * | 1/1989 | Buma et al. | 280/124.161 |
| 4,911,617 A * | 3/1990 | Buma et al. | 417/439 |
| 6,089,831 A | 7/2000 | Bruehmann et al. | |
| 6,149,246 A * | 11/2000 | Terborn et al. | 303/7 |
| 6,276,761 B1 | 8/2001 | Beck | |
| 6,367,887 B1 | 4/2002 | Sulzyc | |
| 6,682,459 B1 * | 1/2004 | Knight | 477/183 |
| 7,946,660 B2 * | 5/2011 | Diekmeyer et al. | 303/3 |

FOREIGN PATENT DOCUMENTS

| | | |
|---|---|---|
| DE | 29 50 904 C2 | 6/1981 |
| DE | 34 35 089 A1 | 4/1986 |
| DE | 41 09 741 C1 | 3/1992 |
| DE | 40 30 361 A1 | 4/1992 |
| DE | 195 15 895 A1 | 10/1996 |
| DE | 196 22 095 A1 | 12/1997 |
| DE | 198 11 305 A1 | 9/1999 |
| DE | 199 28 113 C1 | 10/2000 |
| DE | 694 26 513 T2 | 2/2001 |
| DE | 199 39 529 A1 | 4/2001 |
| DE | 100 04 091 A1 | 8/2001 |
| DE | 100 29 125 A1 | 1/2002 |
| DE | 101 42 790 A1 | 3/2003 |
| EP | 0 477 519 A1 | 4/1992 |
| EP | 0 810 136 A1 | 12/1997 |
| EP | 0 810 136 B1 | 12/1997 |
| EP | 1 004 495 B1 | 5/2000 |
| EP | 1 122 140 A1 | 8/2001 |
| WO | WO 96/34785 | 11/1996 |
| WO | WO 98/47751 | 10/1998 |

* cited by examiner

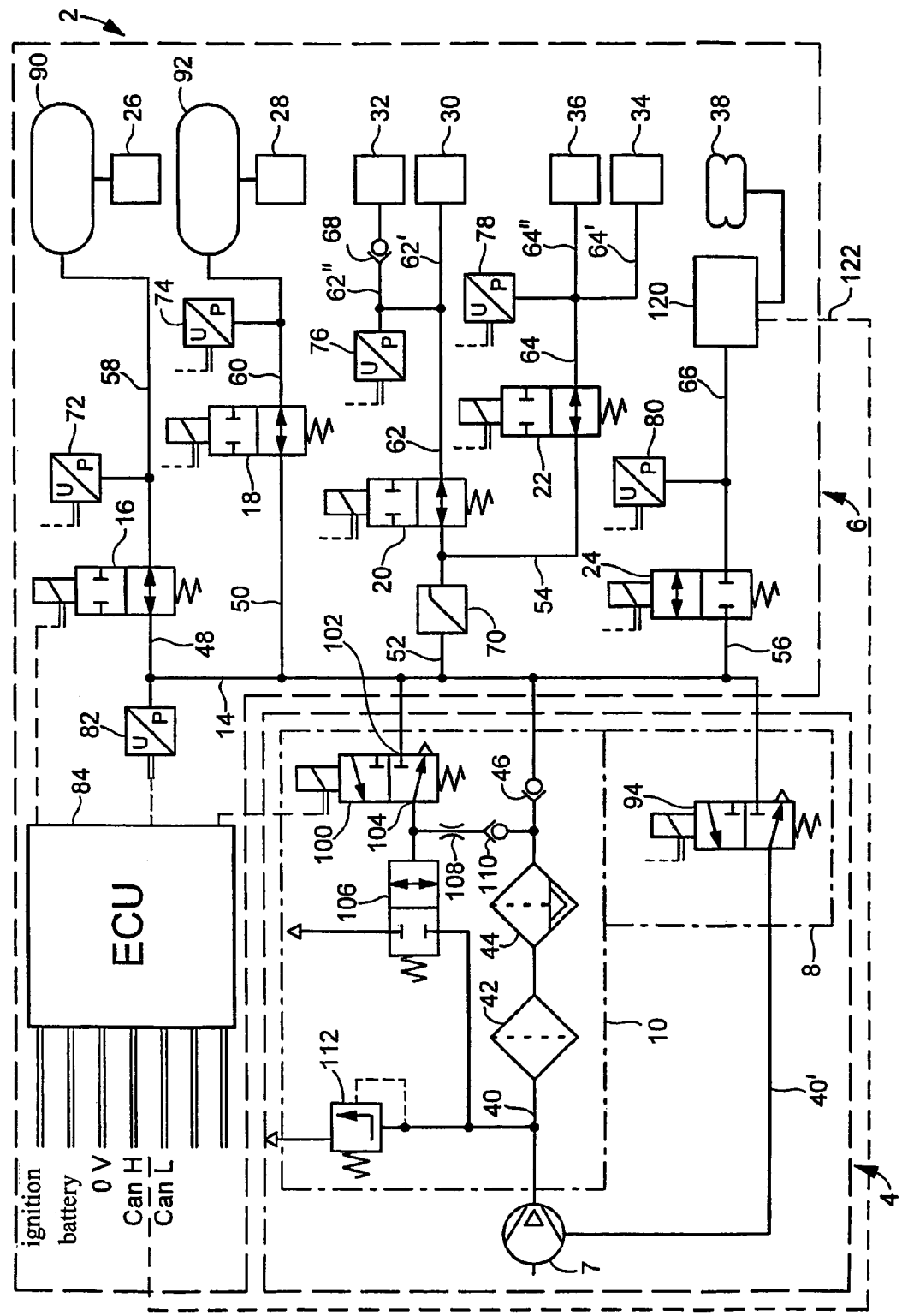

ELECTRONIC COMPRESSED AIR SYSTEM

BACKGROUND OF THE INVENTION

The present invention relates to an electronic compressed air system for vehicles.

WO 98/47751 A1 describes a pneumatic vehicle brake system provided with a compressor, at least one air-load circuit, such as service-brake circuits, a parking-brake circuit, a low-pressure auxiliary circuit and a high-pressure circuit, wherein the circuits are provided with compressed air reservoirs and demand valves. Between the compressor and the at least one load circuit, there are disposed first electrically actuatable valves, which are closed in the de-energized normal state, and, between the compressor and the auxiliary circuit, there is disposed a second electrically actuatable valve, which is open in the de-energized normal state. The valves are actuated by an electronic control unit. The outlet ports of the first valves of the air-load circuits are in communication via check valves with the outlet port of the second valve, which is open in the de-energized normal state. If a compressed air demand exists in one of the load circuits, for example due to too-low reservoir pressure, the corresponding valve is activated by the control unit, whereby the air demand is covered by the compressor, while at the same time the second valve for the auxiliary circuit is closed. Failure of the compressor leads to a pressure drop, which is detected by the control unit, which closes the valves or keeps them closed, whereby the pressure in the circuits is maintained. A pressure-regulating valve determines the pressure level. In the event of failure of the pressure-regulating valve, overpressure is relieved via an overpressure valve. Pressure sensors monitor the circuits. The circuits are supplied with air via the second, normally open valve and via the check valves connected upstream from the circuits. If the electrical system fails, all valves go to normal state. Nevertheless, the compressor continues to run and supplies the circuits with air via the second, normally open valve of the auxiliary circuit, the system pressure being determined by a low-pressure relief valve of the auxiliary circuit. If one valve fails, the associated circuit can be supplied with air via the valve of the auxiliary circuit and the check valve. The known system is complex, since each load circuit is equipped with a compressed air reservoir.

DE 10004091 C2 describes a compressed air supply device for vehicle compressed air systems with a multi-circuit protective valve, a pressure regulator, a supply line for supplying the circuits of the multi-circuit protective valve with compressed air, and a compressor, which can be switched by means of a pneumatic switching device, a pilot valve for controlling the pressure regulator and the switching device being provided, and a throttle being interposed between the pilot valve and the switching device. Each circuit is provided with a compressed air reservoir. The pilot valve is controlled and/or regulated by an electronic control and/or regulation unit. Pressure sensors monitor the pressure in the circuits and in the supply line.

In vehicles with a compressed air brake system, it is known that the EU Brake Directive can be satisfied by providing separate compressed air reservoirs for the front-axle and rear-axle brake circuits. Additional compressed air reservoirs are used for other compressed air consumers, such as an air-suspension circuit, to ensure that the functionality of the brake system is not negatively influenced by the operation of such further compressed air consumers. Such known compressed air systems with separate compressed air reservoirs for a plurality of compressed air load circuits are quite costly.

SUMMARY OF THE INVENTION

Generally speaking, in accordance with the present invention an improved compressed air system is constructed and arranged in such a way that—with the exception of the brake circuits—the need for compressed air reservoirs for further compressed air load circuits, such as air-suspension circuits, can be very largely eliminated, without having to fear negative consequences for the brake circuits.

The present invention provides electrically actuatable valves, preferably solenoid valves, for the individual load circuits. By virtue of the inventively designed compressed air system there are achieved cost savings, because there is no need for compressed air reservoirs for further compressed air consumers, especially for the air-suspension circuit including the associated components. The reservoirs for the service-brake circuits are not dispensed with. By virtue of the inventive design, the costs for the overall system can be reduced. The installation complexity is less. In the case of pressure demand, the further compressed air consumers, especially the air-suspension circuit, can be filled primarily by the service-brake circuits as long as the brake pressures of the brake circuits are in conformity with applicable legal regulations, for which purpose it is merely necessary to open the normally closed solenoid valve of the air-suspension circuit, since the solenoid valves of the service-brake circuits are normally open, or in other words in de-energized normal state. In the compressed air suspension-circuit without compressed air reservoir, the switching frequency of the normally closed solenoid valve is reduced, since actuation takes place only in the case of a request for compressed air from the electronically controlled air-suspension system (ECAS). The system safety and system availability are improved. Because the solenoid valve is closed during normal operation, no reactions due to the air-suspension circuit are felt in the brake circuits.

Still other objects and advantages of the present invention will in part be obvious and will in part be apparent from the specification.

The present invention accordingly comprises the features of construction, combination of elements, and arrangements of parts which will be exemplified in the construction hereinafter set forth, and the scope of the invention will be indicated in the claims.

BRIEF DESCRIPTION OF THE DRAWINGS

The present invention will be described in more detail hereinafter on the basis of the accompanying drawing, in which:

FIG. 1 shows an air-processing system according to a preferred embodiment of the present invention.

DETAILED DESCRIPTION OF THE PREFERRED EMBODIMENTS

Referring now to the FIGURE, where compressed air lines are represented by solid lines and electrical lines by broken lines, there is shown a compressed air system 2 with a compressed air supply part 4 and a compressed air consumer part 6. Compressed air supply part 4 comprises a compressor 7, a compressor control device 8 and an air-dryer part 10.

Compressed air consumer part 6 is provided with a compressed air distributor line 14, a plurality of electrically actuatable solenoid valves 16, 18, 20, 22, 24 with restoring springs and a plurality of compressed air load circuits 26, 28, 30, 32, 34, 36, 38 supplied with compressed air via the solenoid valves.

From compressor 7, a compressed air supply line 40 leads via a filter 42, an air dryer 44 and a check valve 46 to distributor line 14, from which there are branched off lines 48, 50, 52, 54, 56 leading to the solenoid valves. From the solenoid valves, compressed air lines 58, 60, 62, 64, 66 lead to the load circuits. Line 62 splits into lines 62' and 62" leading to circuits 30 and 32, a check valve 68 also being disposed in line 62". A pressure limiter 70 is disposed in supply line 52. Line 54, which leads to solenoid valve 22, branches off downstream from pressure limiter 70. Line 64 splits into lines 64' and 64" leading to circuits 34 and 36.

Pressure sensors 72, 74, 76, 78, 80, 82 monitor the pressure in the consumer loops and in distributor line 14, and transmit the respective pressure as a pressure signal to electronic control unit 84, which directly controls the solenoid valves.

Load circuits 26, 28 can be, for example, service-brake circuits, and load circuit 30 can be a trailer-brake circuit, in which case normally two lines, a supply line and a brake line, lead to the trailer. Load circuit 32 can be a parking-brake circuit with spring accumulator, and load circuits 34 and 36 can be secondary load circuits, such as operator's cab suspension, door controller, etc., in other words, all components that have nothing to do with the brake circuits. Load circuit 38 is designed as a high-pressure circuit for an air-suspension system (represented as an air bellows). An air-suspension system normally requires high pressure, because the air-suspension bellows exhibit large volumes and relatively high pressures.

Service-brake circuits 26, 28 are provided with compressed air reservoirs 90, 92 in conformity with EU Directive 98/12.

The inventive compressed air system makes it possible to dispense with compressed air reservoirs in circuits 30, 32, 34, 36 and particularly in air-suspension circuit 38. As an example, it is permissible to supply other compressed air load circuits from the service-brake circuits (circuits 26 and 28), provided the braking function or braking action of service-brake circuits 26 and 28 is not impaired.

Via a line 40', compressor 7 is mechanically (pneumatically) controlled by compressor controller 8. Compressor controller 8 comprises a solenoid valve 94 of small nominal width that can be switched by electronic control unit 84. In the de-energized normal state it is vented, as illustrated, whereby compressor 7 is turned on. If compressor 7 is to be turned off, for example because all load circuits are filled with compressed air, control unit 84 changes over solenoid valve 94 so that the pressure-actuatable compressor is turned off via line 40'. If solenoid valve 94 is switched to de-energized condition, for example because a load circuit needs compressed air, solenoid valve 94 is again switched to the normal state illustrated in the drawing, whereby line 40' is vented and in this way compressor 7 is turned on.

Air-dryer part 10 comprises a solenoid valve 100 with small nominal width, whose inlet 102 is in communication with distributor line 14 and via whose outlet 104 there is pneumatically switched a shutoff valve 106, which is in communication with supply line 40 of compressor 7 and serves for venting of the air dryer.

When solenoid valve 100 is switched to passing condition, compressor 7 no longer discharges into the load circuits but instead discharges via valve 106 to the atmosphere. At the same time, dry air flows from distributor line 14 (out of reservoirs 90, 92 of the service-brake circuits) via solenoid valve 100, throttle 108 and a check valve 110 through air dryer 44 for regeneration of its desiccant and further via filter 42 and valve 106 to the atmosphere.

Reference numeral 112 denotes an overpressure valve.

Solenoid valves 16, 18, 20, 22, 24 are controlled by control unit 84, solenoid valves 16 to 22 of load circuits 26 to 34 being open in de-energized normal state, while solenoid valve 24 of air-suspension circuit 38 is closed in de-energized normal state. Pilot-controlled solenoid valves can also be used. The pressure in the circuits is directly monitored at the solenoid valves by pressure sensors 72, 74, 76, 78, 80. Air-suspension circuit 38 is electronically controlled by a control device 120 (also known as ECAS), which is connected to electronic control unit 84 via a data line 122.

If the pressure were to drop in a load circuit, for example in circuit 30 (trailer-brake circuit), the compressed air supply by the service-brake circuits also takes place via the open solenoid valves, the pressure in secondary load circuits 30 to 36 being adjusted by pressure limiter 70 to a lower level, such as 8.5 bar, than the pressure level of, for example, 10.5 bar in service-brake circuits 26 and 28. Air-suspension circuit 38 is shut off by solenoid valve 24 and therefore is not in communication with the other circuits. It frequently has a higher pressure level, such as 12.5 bar.

If the reservoir in air-suspension circuit 38 is dispensed with, as described hereinabove, and as is made possible by the specially described arrangement and construction of the solenoid valves, only the reservoir volumes of the service-brake circuits and a small dead volume up to the load circuits exist. If a small leak occurs in an air-suspension system without compressed air reservoir, frequent regulation via solenoid valve 24 would normally be required. Because of the large nominal width of solenoid valve 24, the corresponding regulation algorithm is extremely complicated, and so it would be desirable to open the solenoid valve only when the air-suspension circuit actually needs compressed air. In this way it is possible to dispense with the pressure regulation described hereinabove.

In the event of a compressed air demand, for example because of a level-regulation function, control device 120, which is connected via data line 122 to electronic control unit 84, sends a compressed air request signal via the data line to electronic control unit 84. This checks whether the pressures (or flow rate, air mass or energy) in brake circuits 26 and 28 are in conformity with the specified index values. If this is the case, control unit 84 switches solenoid valve 24 from the closed normal position to the open position, whereby communication with reservoirs 90, 92 of the service-brake circuits is established via normally open solenoid valves 16, 18. Air-suspension circuit 38 is then filled from compressed air reservoirs 90, 92 of brake circuits 26, 28 via open solenoid valves 16, 18 thereof. If the pressure in the brake circuits, measured by pressure sensors 72, 74, drops below the specified value, this is detected by electronic control unit 84, which thereupon closes solenoid valve 24 of air-suspension circuit 38 and turns on compressor 7 via compressor control device 8 by changing over solenoid valve 94. The compressor discharges into the brake circuits. When the index pressure has been restored in the brake circuits, electronic control unit 84 switches solenoid valve 24 of air-suspension circuit to open position once again, so that the air-suspension circuit continues to be filled by the brake circuits or by compressed air reservoirs 90, 92 thereof. This cyclic filling by the brake circuits is continued until the index pressure is reached in air-suspension circuit 38. The pressure-request signal disappears, solenoid valve 24 is closed once again and the brake circuits are filled once again. Thereafter, solenoid valve 94 is switched to the vented normal state once again in order to turn off compressor 7 and to vent line 40'.

The compressor normally discharges only into brake circuits 26, 28. If necessary, it can also discharge into the air-suspension circuit, in which case, depending on the air pressure in the brake circuits, solenoid valves 16, 18 of the brake circuits can be closed.

Solenoid valves 20 and 22 of the secondary load circuits remain open, since the pressure in associated load circuits 30 to 36 is limited by pressure limiter 70.

As discussed above, air-suspension circuit 38 usually has a higher pressure level than the other circuits; nevertheless, it needs pressure relatively infrequently, and so, according to the present invention, it is closed in de-energized condition. In the event of a demand, it also does not need its compressed air within a very short time (msec or fractions of seconds), and so, a certain dead time can be tolerated for communication with electronic control unit 84; the air-suspension circuit is therefore normally closed. Circuits 30 to 36 are supplied from reservoirs 90 and 92 of service-brake circuits 26 and 28, and so valves 16, 18, 20 and 22 thereof are open in de-energized condition during normal driving.

As an alternative to the pressure, it is also possible to monitor other variables of state, such as air flow rate, air mass and energy, in the load circuits and distributor line.

It will thus be seen that the objects set forth above, among those made apparent from the preceding description, are efficiently attained, and since certain changes may be made in the above constructions without departing from the spirit and scope of the invention, it is intended that all matter contained in the above description or shown in the accompanying drawing shall be interpreted as illustrative and not in a limiting sense.

It is also to be understood that the following claims are intended to cover all of the generic and specific features of the invention herein described and all statements of the scope of the invention which, as a matter of language, might be said to fall therebetween.

What is claimed is:

1. An electronic compressed air system for a vehicle comprising:
    a compressed air supply part including a compressor; and
    a compressed air consumer part, said compressed air consumer part including:
        a plurality of service-brake circuits having compressed air load circuits and compressed air reservoirs;
        a high pressure compressed air load circuit;
        electrically actuatable valves comprising a first plurality of electrically actuatable valves and at least one other electrically actuatable valve, said first plurality of electrically actuatable valves being operable to supply compressed air to said plurality of service-brake circuits, said at least one other electrically actuatable valve being operable to supply compressed air to said high pressure compressed air load circuit, and said first plurality of electrically actuatable valves being in an open position in a de-energized condition during normal driving;
        sensors for monitoring pressure in said plurality of service-brake circuits; and
        an electronic control unit configured to evaluate electrical signals from said sensors and to control said electrically actuatable valves, said at least one other electrically actuatable valve operable to supply compressed air to said high pressure compressed air load circuit being switchable by said electronic control unit between a closed position in a de-energized condition during normal driving and an open position to establish communication between said at least one other electrically actuatable valve with at least one of (i) said service-brake circuits (ii) said compressed air reservoirs and (iii) said compressed air supply part, when compressed air is requested for said high pressure compressed air load circuit.

2. The compressed air system according to claim 1, wherein said high pressure compressed air load circuit is an air-suspension circuit.

3. The compressed air system according to claim 1, wherein said electronic control unit is adapted to iteratively (i) close said at least one other electrically actuatable valve operable to supply compressed air to said high pressure compressed air load circuit and turn on said compressor to refill said plurality of service-brake circuits when a state variable in said plurality of service-brake circuits drops below a preselected value, (ii) reopen said at least one other electrically actuatable valve operable to supply compressed air to said high pressure compressed air load circuit when an index value is reestablished in said plurality of service-brake circuits, and, thereafter, when said high pressure compressed air load circuit reaches said index value, switch said at least one other electrically actuatable valve to a closed normal state and turn off said compressor.

4. The compressed air system according to claim 1, wherein said electrically actuatable valves are solenoid valves.

5. The compressed air system according to claim 1, further comprising an electronic control device adapted to control said high pressure compressed air load circuit and to communicate with said electronic control unit via a data line.

6. The compressed air system according to claim 5, wherein said data line is operable to carry a compressed air demand transmission to said electronic control device.

7. The compressed air system according to claim 1, wherein said compressed air load circuits have at least one secondary load circuit without compressed air reservoirs.

8. The compressed air system according to claim 7, wherein said at least one secondary load circuit has a lower pressure level than in said service-brake circuits.

9. The compressed air system according to claim 7, wherein said high pressure compressed air load circuit has a pressure level that is higher than in said service-brake circuits and in said at least one secondary load circuit.

10. The compressed air system according to claim 7, wherein said at least one secondary load circuit includes solenoid valves, and further comprising a pressure-limiting valve interposed upstream from said solenoid valves of said at least one secondary load circuit.

11. The compressed air system according to claim 1, wherein said electrically actuatable are connected to a common compressed air distributor line, to which there is connected a compressed air supply line in communication with said compressor.

12. The compressed air system according to claim 11, further comprising an air dryer and a check valve disposed in said compressed air supply line.

13. The compressed air system according to claim 3, wherein said state variable is one of pressure, air flow rate, air mass and energy.

* * * * *